(12) United States Patent
Larsson

(10) Patent No.: US 6,299,048 B1
(45) Date of Patent: Oct. 9, 2001

(54) PLANT FOR FRICTION STIR WELDING

(75) Inventor: Rolf Larsson, Laxå (SE)

(73) Assignee: Esab AB, Gothenburg (SE)

( * ) Notice: Subject to any disclaimer, the term of this patent is extended or adjusted under 35 U.S.C. 154(b) by 0 days.

(21) Appl. No.: 09/202,560

(22) PCT Filed: Jun. 18, 1997

(86) PCT No.: PCT/SE97/01100

§ 371 Date: Jan. 22, 1999

§ 102(e) Date: Jan. 22, 1999

(87) PCT Pub. No.: WO97/48517

PCT Pub. Date: Dec. 24, 1997

(30) Foreign Application Priority Data

Jun. 20, 1996 (SE) .................................................... 9602456

(51) Int. Cl.⁷ .................................................. B23K 20/12
(52) U.S. Cl. .......................... 228/2.1; 228/13; 228/112.1; 228/19

(58) Field of Search ........................... 228/2.1, 13, 112.1, 228/19

(56) References Cited

U.S. PATENT DOCUMENTS 4,043,497 * 8/1977 Jones .......................................... 228/2
5,794,835 * 8/1998 Colligan et al. ....................... 228/2.1

* cited by examiner

*Primary Examiner*—M. Alexandra Elve
(74) *Attorney, Agent, or Firm*—Burns, Doane, Swecker & Mathis L.L.P.

(57) ABSTRACT

A plant for friction stir welding, comprising a welding probe, a drive unit driving the welding probe, a work table supporting the workpiece or workpieces to be welded, and at least one clamping means for clamping the workpieces to one another or to the work table, or the workpieces to the work table, respectively, during the welding operation. The plant likewise comprises a milling tool.

12 Claims, 4 Drawing Sheets

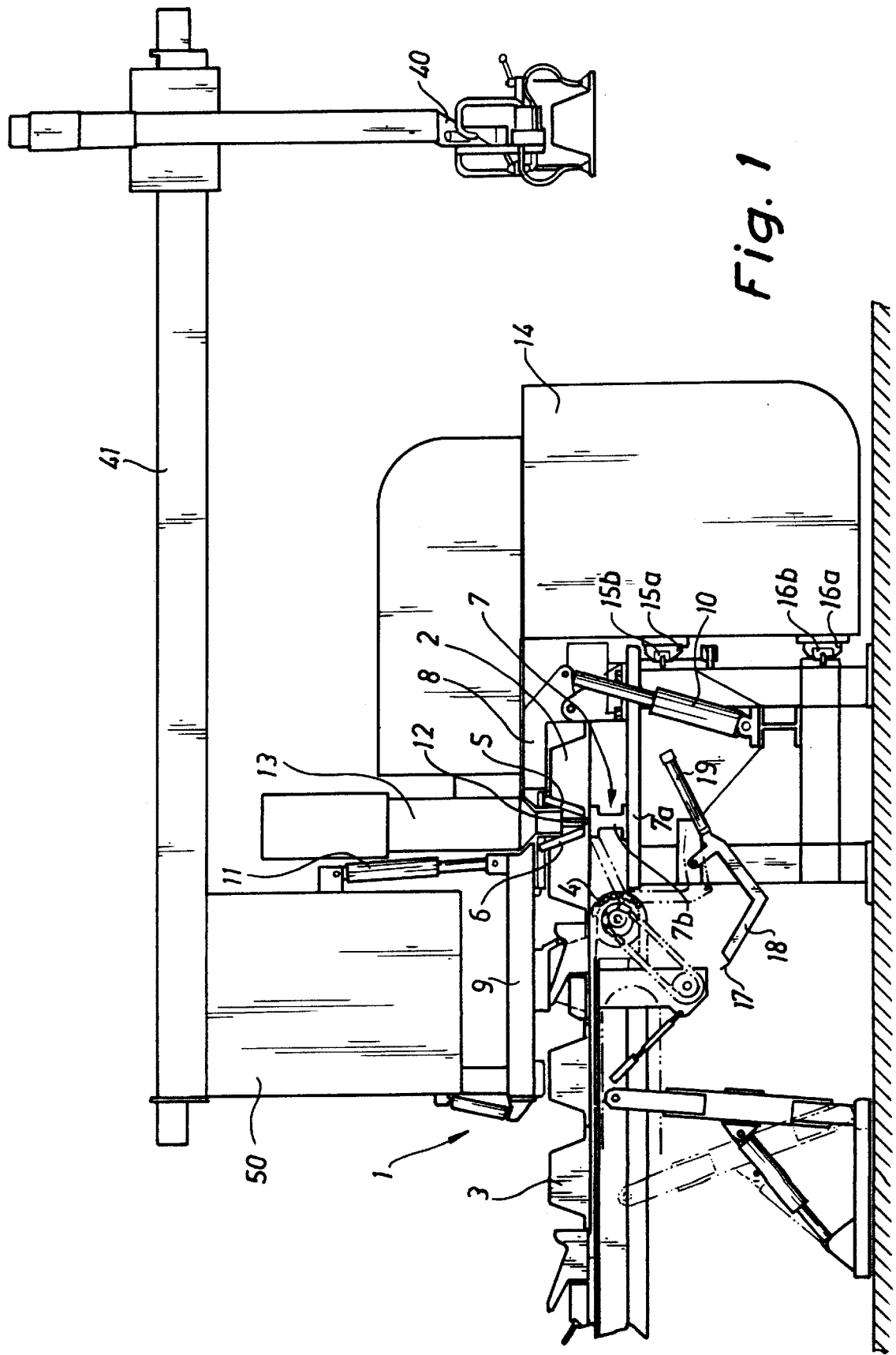

PLANT FOR FRICTION STIR WELDING

BACKGROUND OF THE INVENTION

The present invention relates to a plant for friction stir welding, comprising a welding probe, a drive unit driving the welding probe, a work table supporting the workpiece or workpieces to be welded, and at least one clamping means for clamping the workpieces to one another and/or to the work table or the workpiece to the work table, respectively, during the welding operation.

DESCRIPTION OF THE RELATED ART

The definition friction stir welding designates a welding method according to which the workpieces to be joined together are plasticized along their joint line by supply of frictional heat from a rotating welding probe which is caused to move along the joint between the workpieces while at the same time being pressed against the workpieces. As described in WO93/10935 and WO95/26254 the welding probe should be manufactured from material harder than the workpieces, and during the welding operation the workpieces should be securely fixed relative to one another and to the work table. In this respect this technique differs from that of conventional friction welding according to which the frictional heat is generated by the relative motion of the workpieces as they are being pressed together, i.e. the frictional heat is generated only by the two components to be joined together. This welding technique according to the above-mentioned publications is used for the welding of different materials, such as plastics, metals, etcetera in various fields of application, for example to join workpieces, to repair cracks in a workpiece, and so on. The configuration of the welding probe is conditioned e.g. by the material to be welded and by the intended application.

In the manufacture of ships, railway cars, bridges, oil platforms and so on extruded aluminium or aluminium alloy profile sections are of interest as building components in view of their corrosion resistance, light weight, etcetera. Because the dimensions of the profile sections produced today by the extruding technique are comparatively small and because the welding methods used at present for joining together aluminium profile sections fail to provide a wholly satisfactory result with respect to strength, finish, and deformation, aluminium has not gained but restricted use, despite the above-mentioned advantages that this material possesses.

By instead using the friction stir welding technique a joint is produced the bottom face of which has a fine and smooth finish, with resulting few points of load concentration. In addition, the strength of the joint produced by this joining method is almost equal to that of the basic material. One problem encountered when using the welding technique according to the above patent publications to join together aluminium profile sections is that this welding technique can only be used to join together workpieces separated by a very narrow air gap. Should the air gap exceed this critical value, which among other things depends on the thickness of the sheet metal from which the profile sections are made, a joint is produced having internal cavities and impaired strength. In consequence thereof, extruded aluminium profile sections that cannot be produced to exactly precise dimensions by existing manufacturing methods, require some pre-treatment to avoid too large gaps between the profile sections. This is particularly important in the case of the welding together of elongate profile sections, in which even small deformations may give rise to unacceptable deviations. To produce aluminium plating for hulls, aluminium profile sections having for example a width of 300 mm and a length of 12 m are used.

Another problem encountered in friction stir welding is that deformations of the profile sections may occur also during the welding operation proper, as the sections are exposed to the effects of heat. However, this deformation is of lesser magnitude than in the case of MIG and TIG welding, since the temperature never reaches the melting point. However, the result may be that the dimensions of the end product fail to be within the acceptable tolerance range, despite the pre-treatment of the profile section. This problem is encountered also in applications wherein the tolerance range of the end product is narrower than that of the participating workpieces.

SUMMARY OF THE INVENTION

One object of the present invention thus is to provide a plant for friction stir welding, enabling two workpieces to be welded together in such a manner that the resulting end product is imparted high strength and falls within a specified tolerance range without the profile sections having to be subjected to a pre-treatment in a particular unit prior to their being presented to the plant or in between the discrete welding operations. In this manner, production time as well as production costs are reduced.

Another object of the present invention is to provide a plant for friction stir welding, wherein it is possible to produce an end product having a narrower tolerance range than the participating components.

These objects are obtained in accordance with the present invention by means of a plant for friction stir welding of the kind defined in the introduction, which plant is characterised in that it also comprises a milling tool.

Because of the incorporation in the plant of a milling tool it becomes possible to effect a milling operation before and/or after each separate welding operation, which ensures acceptable tolerance ranges in the discrete aluminium profile sections as well as the formed aluminium panels without the sections or panels having to be passed through an external pre- or post-treatment unit. An additional advantage is that the aluminium profile sections will be given such a degree of straightness in the milling operation that the inter-workpiece air gaps do not exceed the value at which a faulty joint is produced.

The welding probe may be exchangeable for the above-mentioned milling tool and preferably the latter tool is driven by the drive unit serving the welding probe. Alternatively, the welding probe and the milling tool are driven by separate drive units. In the latter case, the milling tool may be positioned adjacent the welding probe or be positioned remote therefrom.

The plant could also be formed with a recess in the work table in front of the milling tool in order to enable milling operations to be performed throughout the thickness of the workpiece. In this case, the operative position of the milling tool must be separate from the operative position of the welding probe, since during welding direct backing of the joint from the working table is essential in order to achieve a smooth bottom face of the joint. The clamping means could be placed in the same or in different positions during welding and milling whereas the workpiece must assume different positions laterally during the welding and the milling operations. As a result, deactivation and activation, respectively, of the clamping means is effected to release and re-clamp the workpiece.

The plant could likewise comprise a spacer member which is placed intermediate the workpiece and the working table when the milling tool is in its active position. owing to this arrangement, the clamping means and the workpiece may assume the same position laterally during welding and milling, obviating the need for making the clamping means laterally displaceable. From a machine-constructional point of view this is a considerable advantage.

BRIEF DESCRIPTION OF THE DRAWING FIGURES

The invention will be described in closer detail in the following with reference to the accompanying drawings illustrating various embodiments of the plant in accordance with the invention. In the drawings:

FIG. 1 is a lateral view of a first embodiment of a plant for friction stir welding in accordance with the invention, the plant being seen in its welding position.

DETAILED DESCRIPTION OF EMBODIMENT OF THE INVENTION

Figure 2A:
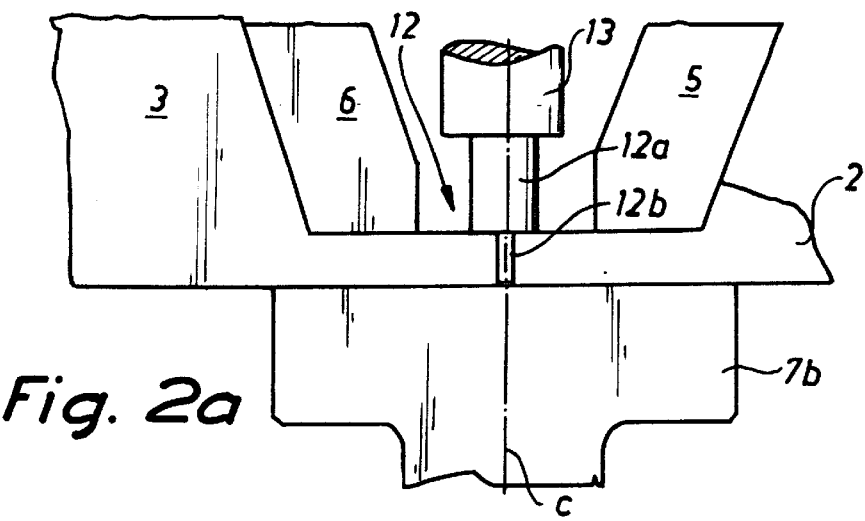
FIG. 2a is an enlarged view of a part of the plant of FIG. 1.

The plant 1 illustrated in FIG. 1 is adapted to be used to weld together extruded aluminium profile sections 2 in order to form an aluminium panel 3. The expression aluminium is used herein to designate either pure aluminium or an alloy of aluminium and another metal, such as mangnesium. The number of aluminium profile sections to be welded together is determined by the width of the profile section in question, which could for example have a width of 300 mm and a length of 12 m, and by the requested width of the finished panel. The manufacture is effected by welding a fresh aluminium profile section to the right-hand marginal edge of the immediately preceding profile section, as illustrated in FIG. 1, this immediately preceding profile section in turn having previously been welded to the right-hand marginal edge of the preceding profile section. In other words, the width of the aluminium profile section being manufactured increases by the width of one profile section in each separate welding operation.

In accordance with the example shown in FIG. 1 the panel 3 being manufactured is increased by one aluminium profile section 2, consisting, at the end of the ongoing welding operation, of five aluminium profile sections. After welding, the panel is displaced to the left as seen in FIG. 1 by an intermittently operating chain conveyor, over a distance corresponding to the width of the profile section in question. At the same time a fresh aluminium profile section is entered by means of infeed means 40 which are arranged for displacement along beams 41. The latter are securely connected to the machine frame 50 of the plant.

During the welding operation, the aluminium profile section 2 and the semi-finished aluminium panel 3 are held together and secured to the work table 7 by clamping means 5 and 6, respectively. The clamping means 5 and 6, respectively, consist of triangularly shaped pressure members which via arms 8 and 9, respectively, are urged into a position of engagement with the respective workpieces 2, 3 during the welding operation by means of pressure cylinder units 10 and 11, respectively. The pressure cylinders 10 and 11 are connected to the work table 7 and to the machine frame 50, respectively. The clamping means are arranged in pairs in facing relationship along the edges of the joint between the workpieces. The spacing between the centre lines of two neighbouring pairs amounts to approximately 500 mm in the subject example. Owing to the reduced space available, each pressure member 5 is driven by a separate pressure cylinder 10 whereas two neighbouring pressure members 6 are driven by a common pressure cylinder 11 via the arm 9. For this purpose, the arm has a U-shaped configuration, the pressure members being attached to the legs of the U-shaped arm and the pressure cylinder to the web thereof. In this case the work table consists of a stationary, horizontal machine table 7a on which a backing bar 7b is fixedly mounted.

The joint between the profile section 2 and the panel 3 is positioned in alignment with the centre line of the backing bar. The positioning of the workpieces not directly on the machine table but on the backing bar interposed between the table and the workpiece is a pure safety measure, it being a great deal more convenient to replace the comparatively smaller backing bar than the entire machine table, should the top face thereof be subjected to damage during the manufacture of the panel. Aluminium is a very soft metal and the plasticisation during the welding operation will cause it to adopt an identical configuration to that of the top face of the backing bar, and consequently any depressions in that top face would be reproduced in the form of protruding formations on the bottom face of the panel. The finished aluminium panel thus would fail to meet laid-down quality standards.

Welding is performed by means of a welding probe 12 configured, see FIG. 2a, as a cylindrical body 12a and a pin 12b attached thereto, the upper part of the body being connected to a rotating spindle 13 driven by a drive unit, not shown, such as a drive motor, and supported by a runner 14. The runner is traversed along the workpieces 2 and 3 by means of a drive unit, not shown. The body and the pin of the welding probe could be configured in the manner appearing from any one of the embodiments disclosed in WO93/10935 or WO95/26254.

To ensure that the welding probe is positioned in the same position relative to the workpiece-joint edges along the entire joint, the runner 14 is connected to the work table 7 via two guide shoes 15a and 16a, each travelling along the respective one of work-table mounted guide rails 15b and 16b. This arrangement provides a rectilinear movement relative to the work table.

FIG. 1 also shows a spacer element 17 which is fixedly secured to holders 18. A pressure cylinder unit 19 displaces each holder from an idle position (shown in continuous lines), in which position the spacer element is spaced from the backing bar, to a position of engagement (in dash-and-dot lines), in which the spacer element is positioned on top of the backing bar. In this position the spacer element extends alongside the entire backing bar and consequently the number of holders will be determined by the length of the backing bar, which in this case amounts to about 16 m, and in the shown example six holders are provided.

Figure 2B:
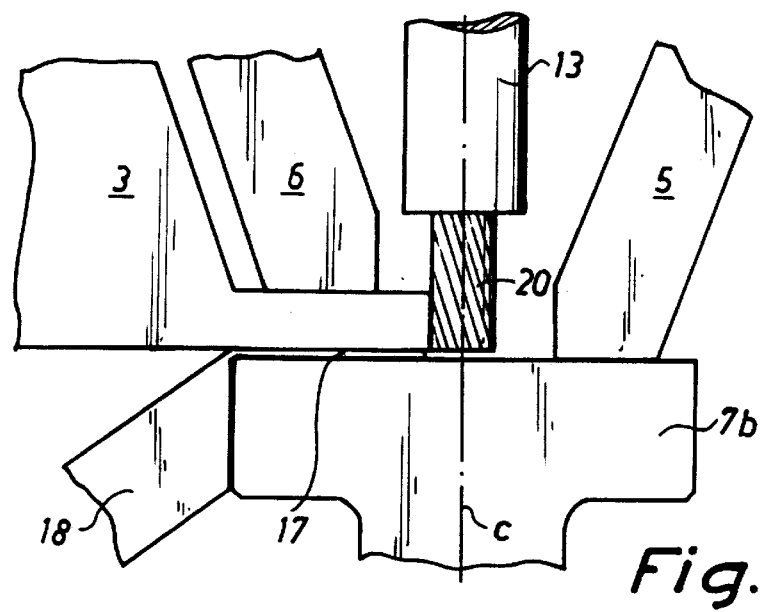
FIG. 2b illustrates the same part as FIG. 2a, but the plant is shown in the milling position thereof.

In FIG. 2b the welding probe 12 has been replaced by a conventional milling tool 20 which likewise is connected to the spindle 13 and thus is driven by the spindle drive unit. In accordance with this embodiment, the milling position coincides with the welding position. The holder 18 assumes its position of engagement and consequently the spacer element 17 is positioned on top of the backing bar 7b. Thus, the semi-finished aluminium panel 3 is spaced from the top face of the backing bar. As a result, the right-hand end margin of the workpiece 3 may be subjected to milling operations also at the lower edge thereof without any risks of simultaneous milling of the top face of the backing bar, undesired working of the backing bar thus being avoided. The panel 3 is clamped to the backing bar 7b also during the milling operation by means of the clamping means 6, the latter assuming the same position relative to the backing bar centre line c as during the welding as shown in FIG. 2a.

Figure 3A:
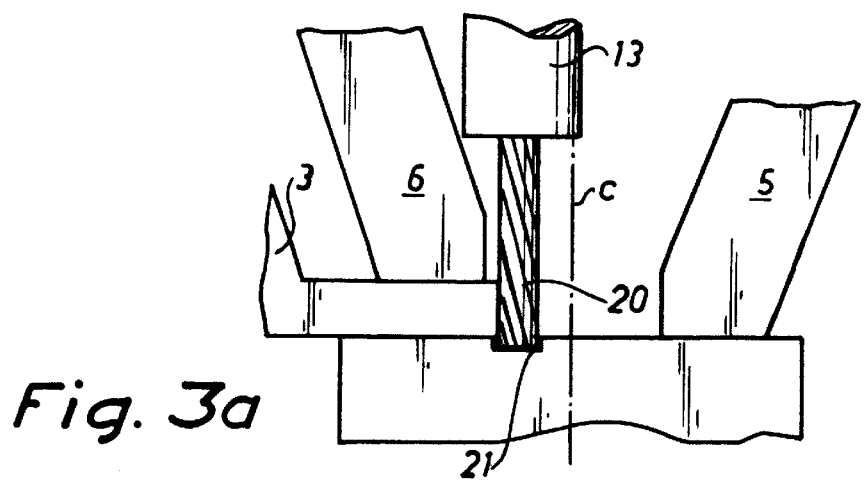
FIG. 3a is a cross-sectional view through a second embodiment, the plant being shown in the milling position thereof.

In FIG. 3a the spacer element is replaced by a recess in the shape of a groove 21 extending along the entire backing bar 7b. In the welding operation, the aluminium will adopt the shape of the top face of the bar, for which reason the groove must not be positioned in the area of the backing bar that serves as a mould for the workpieces 2, 3. Consequently, the milling position must be separate from the welding position and the distance from the backing bar centre line c to the inner edge of the groove 21 must exceed or equal the distance from said centre line to the outer edge of the welding probe. The milling position as well as the panel 3 thus are displaced to the left comoared with the position in FIG. 2b. Also in accordance with this embodiment the panel 3 is clamped to the backing bar 7b by the clamping means 6, the latter assuming the same position relative to the centre line c of the backing bar as during the welding and milling operations according to FIGS. 2a and 2b, respectively. However, the clamping means 6 must be deactivated and re-activated to allow lateral displacement of the workpiece in the interim between the welding and milling operations. In consequence hereof the milling tool is moved closer to the clamping means than is the case in the previous embodiments, which causes problems when the workpieces to be joined by welding consist of thin sheet-metal plates. The thinner the workpieces, the closer the clamping means need to be positioned to the welding probe to be able to hold the workpieces in position despite the considerable forces acting on them during the friction stir welding operation, and the less space available to accommodate the milling tool, particularly when a milling tool of ordinary diameter is to be used. In order to obviate this problem the clamping means may be configured to allow them to be placed in different positions during the welding and the milling operations, respectively, as shown in FIG. 3b.

Figure 4:
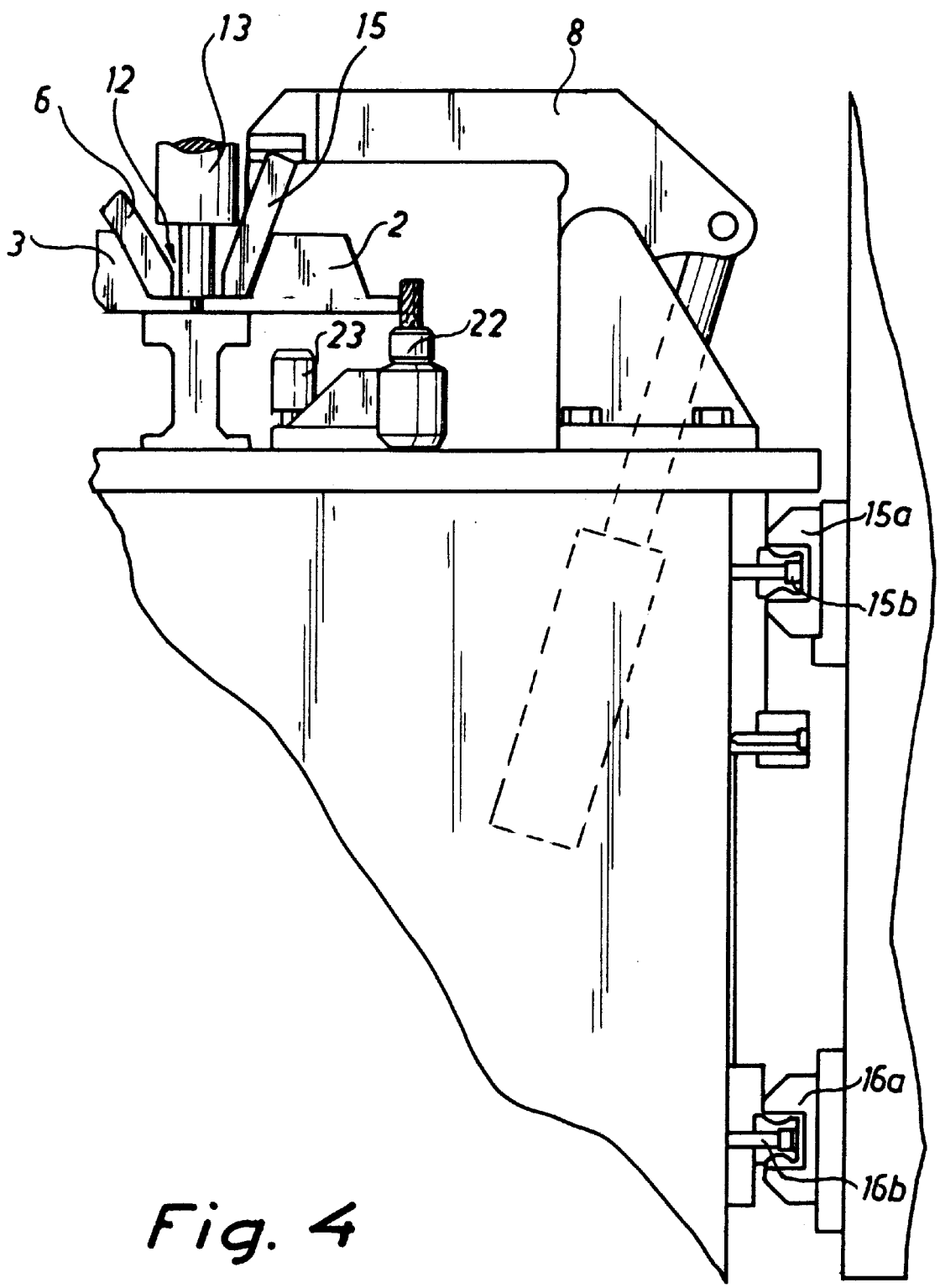
FIG. 4 is a cross-sectional view of a fourth embodiment of the plant, shown in the combined welding and milling position thereof.

As illustrated in FIG. 4, the milling tool could be a separate unit 22 driven by a separate drive unit 23, and in this case the milling tool is spaced from the welding probe. A consequence of this arrangement is that at the same time as the aluminium profile section 2 is being welded to the semi-finished aluminium panel 3 at its left-hand marginal edge its right-hand marginal edge may be subjected to a straightening milling operation, ensuring an accelerated rate of production. Although the milling tool 22 is driven by a separate drive unit it is, of course, possible to place it adjacent the welding probe.

When a predetermined number of aluminium profile sections are to be welded together to form an aluminium panel of desired size, two aluminium profile sections are initially clamped in the plant 1 by means of the clamping means 5, 6 while ensuring that the air gap between the facing marginal edges of the profile sections does not exceed the size that is prone to produce a deficient joint. As appears from FIG. 2a, the gap is located in alignment with the centre line c of the backing bar 7b. The critical gap width varies according to the thickness of the sheet-metal of the profile sections concerned, and in the case of a sheet-metal thickness of about 6 mm the critical gap size is approximately 1 mm. The welding operation is then initiated by causing the welding probe to rotate at a certain speed while at the same time it is displaced along the gap at a predetermined speed. As described in the introduction, the marginal edges of the profile sections will become plasticized while at the same time being pressed together. After solidifying, a homogeneous seam possessing high strength thus has formed. When the welding probe 12 has travelled along the entire joint and the individual welding operation thus is completed, the pressure cylinder units 10 and 11 are actuated, thus deactivating the clamping means 5 and 6, respectively. Consequently, the aluminium panel 3 just formed is released from the work table 7 and is advanced by the chain conveyor 4 to the left as seen in FIG. 1 by a distance corresponding to the width of one aluminium profile section, allowing the panel to be welded in the manner just described to a fresh aluminium profile section 2 which is supplied by infeed means 40.

Figure 3B:
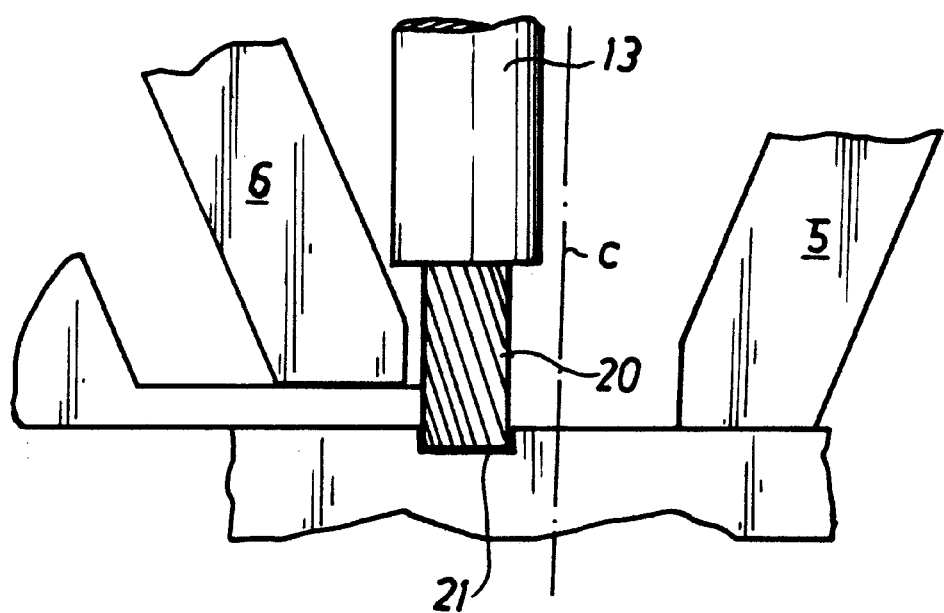
FIG. 3b illustrates a third embodiment of the plant in the milling position thereof.

When for instance four aluminium profile sections 2 have been welded together the right-hand marginal edge of the panel thus formed is scanned with respect to straightness and should this deviate from predetermined tolerance values a milling operation is performed with the aid of the milling tool 20 prior to welding, in cases when the milling operation is performed in accordance with the embodiments of FIGS. 2b, 3a and 3b, but concurrently with the welding, in case the milling operation is performed by means of the separate milling unit 22 illustrated in FIG. 4. The embodiment according to FIG. 2b requires that the spacer element 17 is placed underneath the panel 3 by the holders 18 prior to clamping by means of the clamping means 6. When the embodiment of FIG. 3a is used, on the other hand, the spindle 13 as well as the panel 3 must be displaced to the left as seen in that drawing figure, prior to milling. In accordance with the embodiment of FIG. 3b also the clamping means 6 must be displaced to the left as seen in that drawing figure, before milling. According to these three embodiments milling is performed before a fresh aluminium profile section is clamped in position by means of clamping means 5, and the latter means thus will not interfere with the milling operation.

After milling, the milling tool 20 is exchanged for the welding probe 12 and the above welding cycle is repeated until another correcting milling operation need be performed. The frequency of the milling operations obviously is conditioned on the manufacturing accuracy of the profile sections and on the desired quality of the finished aluminium panel.

The invention should not be regarded as restricted to the above embodiments but could be modified in a variety of ways within the scope of the appended claims. For instance, the welding probe could be automatically exchangeable for the milling tool instead of manually, by means of a tool-changing mechanism, not shown. The plant could be used to weld together workpieces made from other metals or metal alloys than aluminium, such as e.g. titanium or steel. As a rule, the plant is used to weld two workpieces together, such as a semi-finished aluminium panel and a fresh aluminium profile section, but it could equally well be used to repair cracks formed in a workpiece, such as a finished aluminium panel.

What is claimed is:

1. A plant for friction stir welding, comprising:
   a welding probe having a welding position;
   a drive unit driving the welding probe;
   a work table for supporting the workpiece or workpieces to he welded;
   at least one clamping means for clamping the workpieces to one another, for clamping the workpieces to the work table, or both, or for clamping a workpiece to the work table, during the welding operation;
   a milling tool having an operative position; and
   a spacer element positioned intermediate the workpiece and the work table when the milling tool assumes the milling tool operative position, the milling tool operative position essentially coinciding with the welding position.

2. A plant as claimed in claim 1, wherein the welding probe is exchangeable for the milling tool, and that the milling tool is driven by the welding probe drive unit.

3. A plant as claimed in claim 1, further comprising separate drive units driving the welding probe and the milling tool.

4. A plant as claimed in claim 3, wherein the milling tool is arranged adjacent to the welding probe.

5. A plant as claimed in claim 1, wherein the clamping means is arranged to assume the same position during the welding and the milling operations.

6. A plan as claimed in claim 1, wherein the clamping means is arranged to assume different positions during the welding and the milling operations.

7. A plant as claimed in claim 2, wherein the clamping means is arranged to assume the same position during the welding and the milling operations.

8. A plant as claimed in claim 3, wherein the clamping means is arranged to assume the same position during the welding and the milling operations.

9. A plant as claimed in claim 4, wherein the clamping means is arranged to assume the same position during the welding and the milling operations.

10. A plant as claimed in claim 2, wherein the clamping means is arranged to assume different positions during the welding and the milling operations.

11. A plant as claimed in claim 3, wherein the clamping means is arranged to assume different positions during the welding and the milling operations.

12. A plant as claimed in claim 4, wherein the clamping means is arranged to assume different positions during the welding and the milling operations.

* * * * *